Sept. 20, 1966  M. A. BERMAN  3,273,847
BRACKET CONSTRUCTION
Filed May 16, 1963
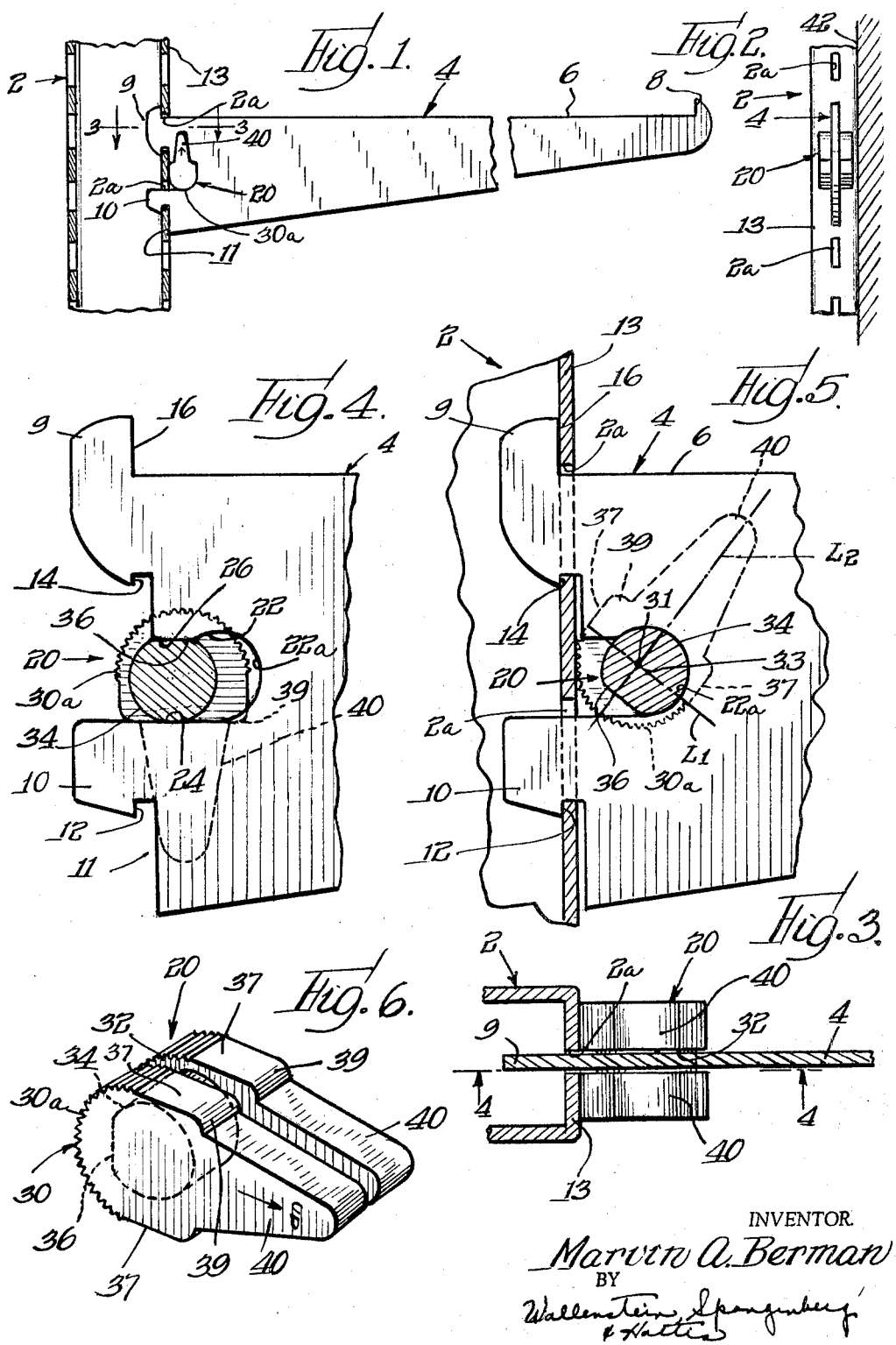
INVENTOR.
Marvin A. Berman
BY
Wallenstein Spangenberg
& Hattis

United States Patent Office 3,273,847
Patented Sept. 20, 1966

3,273,847
BRACKET CONSTRUCTION
Marvin A. Berman, Highland Park, Ill., assignor to Capitol Hardware Mfg. Co., Inc., Chicago, Ill., a corporation of Illinois
Filed May 16, 1963, Ser. No. 280,929
2 Claims. (Cl. 248—243)

The present invention relates to brackets for supporting shelving and the like, and has its most important application in brackets made from sheet metal stampings forming vertically oriented plate members having vertically spaced hooked extensions at the rear edge thereof adapted to pass through corresponding openings in a hollow upright.

It is usually desirable to lock the brackets fairly securely to the uprights so that there is a minimum of play. One way of minimizing the play is to manufacture the brackets and uprights to close tolerances so that the hooked extensions at the rear of the brackets and the uprights so that there is a minimum of play. One way of minimizing the play is to manufacture the brackets and uprights to close tolerances so that the hooked extensions at the rear of the brackets and the uprights will always fit tightly together. This greatly increase the cost of manufacture of the brackets and uprights and also makes it more difficult to remove the brackets from the uprights for replacement or repositioning on the uprights. One well known way of obviating the requirement of close tolerances in the manufacture of the brackets and the uprights is to rotatably attach a camming device near the rear edge of each bracket which, upon rotation of the camming device, will press against the front of the upright to draw the hooked extensions of the bracket tightly against the upright. One well known type of camming device consists of a member rotatably mounted for rotation about a transverse horizontal axis in a circular opening at the rear edge of the bracket, the cam member having an eccentric cam surface which projects varying degrees beyond the rear edge of the bracket as the cam member is rotated. The cam member may be provided with a screwdriver slot for receiving the end of a screwdriver for rotating the cam member from its loose fitting to its tight fitting position where it locks the bracket upon the upright.

Various cam member designs for the above purposes have heretofore been made with varying degrees of success. One of the disadvantages of the cam member with the screwdriver slot is that it requires the use of a screwdriver to lock the bracket in place, which makes it inconvenient where a screwdriver is either not available or the screwdriver slot is not readily visible or physically accessible. These cam members usually fit into openings in the brackets which require the cam members to be force fitted into the openings which sometimes damages the cam members when they are made of plastic material. Also, when these cam members are usually cylindrical, and so it is difficult to determine the mounting position of the cam members which is the loose position thereof. Other forms of cam members heretofore used have also left much to be desired from the standpoint of ease of assembly of the cam member with the bracket, the accessibility thereof and the ease of operation in tightening or loosening the cam member.

It is, therefore, the primary object of the invention to provide a cam member which overcomes the aforesaid disadvantages. More specifically, one object of the invention is to provide a cam member which is designed to be readily insertable within an opening at the rear of a thin-walled bracket body without damaging the cam member. Another object of the invention is to provide a cam member which is designed so that the operator can readily determine the mounting position of the cam member.

Another object of the invention is to provide a cam member and bracket assembly wherein the cam member does not require any tools to operate the same, but can be rotated readily manually into either a locking or unlocking position with modest finger pressure. A related object of the invention is to provide a cam member as just described which can be readily grasped by the operator from either side of the bracket body. In such case, the cam member can be identical in construction whether used with a bracket placed at the left hand or right hand end of a shelf assembly, and the cam member is accessible for convenient turning if either one side or the other of the cam member is accessible to the operator.

Other objects and advantages of the invention together with the features of the invention which accomplish these objectives will become apparent upon making reference to the specification to follow, the claims and the drawings wherein:

FIG. 1 is a vertical section through an upright supporting bracket assembly constructed in accordance with the present invention;

FIG. 2 is a fragmentary front view of the bracket and upright shown in FIG. 1 mounted contiguous to a wall;

FIG. 3 is an enlarged horizontal sectional view through FIG. 1, taken substantially along the line 3—3 therein;

FIG. 4 is an enlarged fragmentary sectional view through the bracket assembly of FIGS. 1-3 showing the cam member thereof being mounted in position within an opening at the rear of the bracket;

FIG. 5 is a view corresponding to FIG. 4 with the bracket assembly inserted into an upright and the cam member pivoted into a bracket locking position; and FIG. 6 is an enlarged perspective view of the cam member forming part of the bracket assembly shown in FIGS. 1 through 5.

Referring now to the drawings, a conventional rectangular hollow slotted upright 2 is shown supporting a more or less conventionally shaped bracket 4 which extends in a generally horizontal direction from the upright 2. The bracket 4 has an elongated body formed of sheet material or the like which is oriented vertically (i.e. the flat sides thereof are in vertical planes). The bracket has an upper edge 6 which may support a shelf or the like (not shown) and the front end of the bracket terminates in an upwardly extending lip 8 which prevents the shelf from falling off the front of the bracket. Two horizontally spaced brackets like bracket 4 extending from correspondingly spaced uprights are required to support the shelf.

A pair of vertically spaced hooked extensions 9 and 10 extend rearwardly from the rear edge 11 of the bracket 4, the hooked extensions being adapted to extend into and interlocked with the defining edges of a correspondingly spaced pair of slots 2a—2a in the front wall 13 of upright 2. The lower hooked extension 10 has a forwardly facing edge 12 spaced from the rear edge 11 of the bracket by a distance somewhat greater than the thickness of the front wall 13 of the upright 2. The upper hooked extension 9 has a forwardly facing lower edge 14 which is shown spaced approximately the same distance from the rear edge 11 of the bracket as the lower hooked extension edge 12. The upper hooked extension 9 has a forwardly facing upper edge 16 which may be in alignment with the forwardly facing edges 12 and 14 of the hooked extensions 9 and 10. These edges engage the rear face of the front wall 13 of the upright 2 when the bracket is securely locked in place in accordance with the present invention.

The means for locking the bracket 4 in place is a simple, inexpensive cam member generally indicated by reference numeral 20. The cam member 20 as well as the bracket 4 and upright 2 may be made of metal or plastic material.

The cam member 20 is rotatably mounted in a circular segmental opening 22a at the front portion of a cut-out section 22 at the rear portion of the bracket 4. In the preferred form of the invention, the bottommost portion of the cut-out section 22 is defined by a generally horizontal edge 24 forming an extension of the upper edge of the lower hooked bracket extension 10. This edge is tangent to the bottom of the circular segmental opening 22a. The circular segmental opening 22a extends over an arc somewhat more than 180 degrees in length, the upper end of the arc terminating in a generally horizontally extending edge 26 which intersects the rear edge 11 of the bracket. The upper and lower edges 24 and 26 of the cut-out section forms a mouth or entryway into the circular segmental opening 22a of a width less than the diameter thereof. Although the cut-out section 22 may take a variety of forms and have a variety of locations on the bracket 4, in accordance with the broadest aspect of the invention its most important feature is that it has a circular segmental opening 22a which communicates with the rear edge 11 of the bracket by a mouth or entry way having a width less than the diameter of the segmental circular opening 22a. These features aid in the insertion and the secure holding of the cam member 20 on the bracket, for reasons to be explained.

The cam member 20 includes a head portion 30 having a centrally disposed annular slot or groove 32 which is slightly wider than the thickness of the bracket 4. The inner limits of the slot 32 is defined by a cylindrical surface 34 having a flat 36 at one point thereon which is parallel to the transverse axis L1 of the cam member. The cylindrical surface 34 is sized to make a sliding fit with the segmental circular opening 22a of the bracket. The spacing between the flat 36 and the opposite end of the cylindrical surface 34 is approximately the same as the spacing between the upper and lower edges 26 and 24 of the mouth of the cut-out section 22 of the bracket. It is thus apparent that, for one angular position of the cam member 20, the cam member can be slid into the segmental circular opening 22a as shown in FIG. 4. The cam member becomes locked in position on the bracket by rotation of the cam member from this angular position.

The head portion 30 of the cam member has a knurled segmental cylindrical portion 30a extending over an arc of a circle (a 180 degree arc in the illustrated cam member), whose axis is eccentric to the axis 33 of the cylindrical surface 34 of the cam member. The aforesaid transverse axis L1 illustrated in the drawings intersects the ends of the segmental cylindrical portion 30a, as best shown in FIG. 5. Also, the flat 36 on the cylindrical portion 34 of the cam member preferably lies on the side of the axis L1 including the segmental cylindrical portion 30a of the cam member.

The head portion 30 of the cam member has a pair of generally parallel extending flat surfaces 37—37 on opposite sides thereof which extend generally tangent to the ends of the segmental cylindrical portion 30a thereof. Both the flat portions 37—37 and the segmental cylindrical portion 30a of the cam member are bisected by the annular slot. The flat portions 37—37 of the cam member terminate abruptly in inwardly extending shoulders 39—39 which join generally triangularly shaped elongated handle-forming portions 40—40 forming lever arms for the cam member. The lever arms 40—40 form extensions of the portions of the cam member bisected by the slot 32, so that the lever arms are spaced apart to form a clearance space for passage of the bracket 4 therebetween. The longitudinal axis L1 of the lever arms 40—40 preferably intersect the midpoint of the knurled segmental cylindrical portion 30a of the cam member. The illustrated lever arms extend vertically downwardly from the bracket when the cam member is slid into the bracket opening 22a (FIG. 4).

Referring to FIG. 5, the axis 31 of the knurled cylindrical portion 30a of the cam member is spaced to the left of the axis 33 of the cylindrical surface 34 thereof so that when the lever arm 40 is extending upwardly as in FIG. 1 the knurled portion 30a of the cam member will project zero or a minimum distance beyond the rear edge 11 of the bracket. The cam member is placed in this position when the bracket is mounted on the upright. An arrow followed by the word "UP" is placed on the outside of each lever arm to indicate the mounting position of the cam member. Rotation of the lever arm in a clockwise direction from this position will progressively increase the distance the knurled portion 30a projects beyond the rear bracket edge 11. FIG. 5 shows the position of the cam member which locks the particular bracket shown to the upright 2. Obviously, where there are greater clearances between the hooked extensions 9 and 10 and the upright walls, the cam member 20 will be rotated to a more clockwise position than that shown in FIG. 5 to lock the same in place. During the 180 degree rotation of the lever arms from the mounting position of the cam member, the flat 36 thereon does not contact the forwardly facing bearing surface of the circular segmental opening 22a of the bracket to distribute the bearing forces and hence ensure maximum life for the cam member.

Perhaps the most important advantage of the invention is that easy to grasp operating lever arms are located on opposite sides of the bracket when the cam member is mounted in place thereon. Thus, if one side of the bracket is contiguous to a wall 42, such as shown in FIG. 2, the cam member can still be operated by grasping the lever arm 40 on the opposite side of the bracket. A lever arm 40 would also be accessible if the wall 42 were on the opposite side of the bracket to that shown in FIG. 2, provided the former side of the cam member was accessible. The indicia on the outside of the lever arms indicating the desired position of the cam member for mounting the bracket is also highly advantageous. Also, the flat portions 37—37 of the cam member which are tangent to the segmental cylindrical portion 30a of the cam member form stop shoulders which prevent rotation of the cam member beyond a point where the lever arms are spaced substantially from the upright 2, as shown in FIG. 1. Thus, there is always clearance space behind the lever arms which can accommodate the fingers of the user for operating the lever arms. Still another advantage resulting from the present invention is the fact that the provision of the flat 36 on the cylindrical portion 34 of the lever enables the cam member readily to be slid into a secure stable position within the segmental circular opening 22a of the bracket.

Although the various features of the cam member described above are preferred to offer the maximum number of advantages, numerous modifications may be made therein without departing from the broader aspects of the invention. Thus, for example, the position of the flat 36 could be varied, the indicia on the lever arms could be omitted and the extent of the knurled portion 30a could be reduced.

What I claim as new and desire to protect by Letters Patent of the United States is:

1. In combination with a vertically oriented thin-walled bracket body having a generally vertical rear edge with vertically spaced hooked extensions adapted to pass through corresponding openings in an upright to hold the bracket in a forwardly extending position on the upright, the rear portion of the bracket plate being provided with a generally circular opening extending over an arc greater than 180 degrees, there being a 180-degree bearing section of the opening on the front side of said opening facing the rear edge of the bracket body, said opening having a cam member-receiving mouth extending between said vertical edge and said opening, which mouth has a width substantially less than the diameter of the cam member-receiving opening, one edge of said mouth being tangent to said circular opening and the opposite edge thereof being parallel to said one edge and spaced a distance therefrom less than the diameter of said opening, a cam member rotatably mounted in said opening about a transverse horizontal axis and having a head portion with a cylindrical surface having a diameter approximately equal to the diameter of, and making rotatable engagement with the bearing section of said circular cam member-receiving bracket opening, said cylindrical surface having only a single flat thereon which enables the cam member to be slipped into said cam member-receiving opening through said mouth thereof in one angular position of the cam member where rotation thereof from said position will lock the cam member in said opening and move the flat in a direction toward the rear edge of the bracket body, said head portion of the cam member having a curved surface portion which is eccentrically related to said cylindrical surface and which projects beyond the rear edge of the bracket body in progressively varying degrees as the cam member is rotated over a range of angular positions about said axis, said flat on said cylindrical surface being spaced from said 180-degree bearing section of said bracket opening over said range of angular positions of said cam member so the full useful bearing surface of said opening is utilized.

2. In combination with a vertically oriented thin-walled bracket body having a generally vertical rear edge with vertically spaced hooked extensions adapted to pass through corresponding openings in an upright to hold the bracket in a forwardly extending positon on the upright, the rear portion of the bracket plate being provided with a generally circular opening extending over an arc greater than 180 degrees, there being a 180-degree bearing section of the opening on the front side of said opening facing the rear edge of the bracket body, said opening having a cam member-receiving mouth extending between said vertical edge and said opening, which mouth has a width substantially less than the diameter of the cam member-receiving opening, one edge of said mouth being tangent to said circular opening and the opposite edge thereof being parallel to said one edge and spaced a distance therefrom less than the diameter of said opening, a cam member rotatably mounted in said opening about a transverse horizontal axis and having a head portion with a cylindrical surface having a diameter approximately equal to the diameter of, and making rotatable engagement with said bearing section of cam member-receiving bracket opening, said cylindrical surface having only a single flat thereon which enables the cam member to be slipped into said cam member-receiving opening through said mouth thereof in one angular position of the cam member where rotation thereof from said position will lock the cam member in said opening and move the flat in a direction toward the rear edge of the bracket body, said head portion of the cam member having a curved surface portion which is eccentrically related to said cylindrical surface and which projects beyond the rear edge of the bracket body in progressively varying degrees as the cam member is rotated over a range of angular positions about said axis where the degree of projection varies from a minimum to nearly a maximum value, said flat on said cylindrical surface being spaced from said 180-degree bearing section of said bracket opening over said range of angular positions of said cam member, so the full useful bearing surface of said opening is utilized, and at least one lever arm extending from the front of the hand portion of said cam member on one side of the bracket body, said lever arm being located forwardly of the rear edge of the bracket body over the operative positions thereof where it rotates said cam member about said axis over said range of angular positions.

References Cited by the Examiner

UNITED STATES PATENTS

| 431,745 | 7/1890 | Haven | 108—106 |
| 2,113,852 | 4/1958 | Mead | 339—249 |
| 2,892,647 | 6/1959 | O'Neill | 287—58 |
| 2,957,505 | 10/1960 | Marzili | 133—46 |

FOREIGN PATENTS

| 748,578 | 5/1956 | Great Britain. |
| 479,629 | 4/1953 | Italy. |

CLAUDE A. LE ROY, *Primary Examiner.*

W. D. LOULAN, *Assistant Examiner.*